United States Patent

Matsushima et al.

[15] 3,643,151

[45] Feb. 15, 1972

[54] OVERCURRENT PROOF CONSTANT-VOLTAGE

[72] Inventors: Hiroshi Matsushima, Osaka; Ichiro Arimura, Kyoto; Hiroshi Goto, Osaka; Yoshikadzu Nakao, Hirakata, all of Japan

[73] Assignee: Matsushita Electric Industrial Co., Ltd., Osaka, Japan

[22] Filed: Sept. 1, 1970

[21] Appl. No.: 68,719

[30] Foreign Application Priority Data

Sept. 17, 1969 Japan ....................44/75013
Sept. 18, 1969 Japan ....................44/75586

[52] U.S. Cl. ....................323/9, 323/20, 317/33 VR, 317/33 SC, 317/22, 317/36 TD

[51] Int. Cl. ....................H02h 9/02, G05f 1/20

[58] Field of Search ....................317/33 VR, 33 SC, 22, 36 TD; 323/9, 20; 307/252 J, 297

[56] References Cited

UNITED STATES PATENTS

| | | | |
|---|---|---|---|
| 3,448,342 | 6/1969 | Jacobs | 317/33 |
| 3,496,415 | 2/1970 | Ruthenberg | 317/33 VR X |
| 3,538,426 | 11/1970 | Jones | 323/9 |
| 3,303,388 | 2/1967 | Means | 317/33 VR |

*Primary Examiner*—J. D. Miller
*Assistant Examiner*—Harvey Fendelman
*Attorney*—Stevens, Davis, Miller & Mosher

[57] ABSTRACT

A power source circuit having an overcurrent preventing means comprising a transistor connected in series with a load for controlling the output voltage supplied to the load to a constant value, and a base circuit for the transistor including a thyristor triggered by a voltage produced across a current detection resistor connected in series with the load and a delay means to cut off the thyristor a predetermined time after the triggering of the thyristor. The delay means consists of either a combination of a resistor and a capacitor or a combination of a lamp and a photoconductive cell. The thyristor is short circuited either indirectly by driving another switching means or directly through the main component element of the delay means to cut off the thyristor.

5 Claims, 6 Drawing Figures

H. MATSUSHIMA, I. ARIMURA,
H. GOTO AND Y. NAKAO
INVENTORS

BY Stevens, Davis, Miller & Mosher
ATTORNEY

OVERCURRENT PROOF CONSTANT VOLTAGE

This invention relates to power source circuits and, more particularly, to power source circuits having an overcurrent preventing means.

The power source supplying current to a load sometimes supplies excess current to the load due to an accident (for instance, a short circuit in the load). Excess current caused through the load is burdensome not only for the load, but also for the power source. If such excess current continues to flow, the power source would be damaged. To avoid the continued flow of the overcurrent, the power source circuit is usually provided with an overcurrent preventing means (a protection circuit). With the power source circuit having a thyristor, the thyristor once turned on by being triggered due to excess current accidentally caused through the system remains conductive. In order to operate the power source circuit in the normal state again, a circuit to turn off the thyristor is required. Usually, a manual switch means is used to the end of turning off the thyristor.

According to the invention, the protection circuit having a thyristor is provided with a means to automatically restore the normal operative state of the power source circuit, so that the power source circuit may be automatically returned to the normal operative state a constant time after it is rendered into a current-withholding state.

Accordingly, an object of the invention is to provide a power source circuit provided with an overcurrent preventing means of an automatically restorable type.

Another object of the invention is to provide for a constant withholding period from the actuation of the overcurrent preventing means until the restoration of the normal state of the power source circuit.

These and other objects and features of the invention will become more apparent from the following description with reference to the accompanying drawing, in which.

Figure 1:
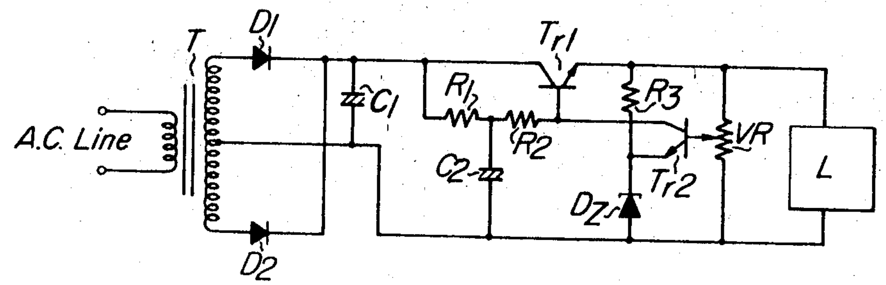
FIG. 1 is a circuit diagram of a typical example of the prior art constant-voltage power source circuit.

FIG. 1 shows a fundamental constant-voltage circuit. It comprises rectifying diodes $D_1$ and $D_2$, a smoothing capacitor $C_1$, a smoothing circuit including a resistor $R_1$ and a capacitor $C_2$, a current control transistor $Tr_1$, an error voltage amplifier consisting of a transistor $Tr_2$, a series circuit including a zener diode $D_z$ and a resistor $R_3$ to provide a constant voltage to the emitter of the transistor $Tr_2$, and a variable resistor VR to provide a preset output voltage. Reference symbol L designates a load connected to the constant-voltage circuit.

In the operation of the constant voltage just described, when the terminal voltage across the load L exceeds a predetermined value, the potential difference between the voltage drop across part of the variable resistor VR, which is fed to the base of the transistor $Tr_2$, and the terminal voltage across the zener diode $D_z$ is impressed on the base of the transistor $Tr_1$ to decrease the base potential thereof. As a result, the conduction level of the transistor $Tr_1$ is reduced to decrease the output voltage supplied across the terminals of the load L. On the other hand, when the voltage supplied to the load L becomes lower than the predetermined voltage, the conduction level of the transistor $Tr_1$ is raised to increase a current into the load L, thus increasing the terminal voltage thereacross.

If the load L is short circuited or rendered into a substantially short-circuited state, so that the load current becomes higher than a predetermined value, the collector power dissipation in the transistor $Tr_1$ is increased. If this situation continues for a long time, the transistor $Tr_1$ would be thermally broken. To avoid this danger, there have been proposed various circuits, which can avoid overcurrent.

Figure 2:
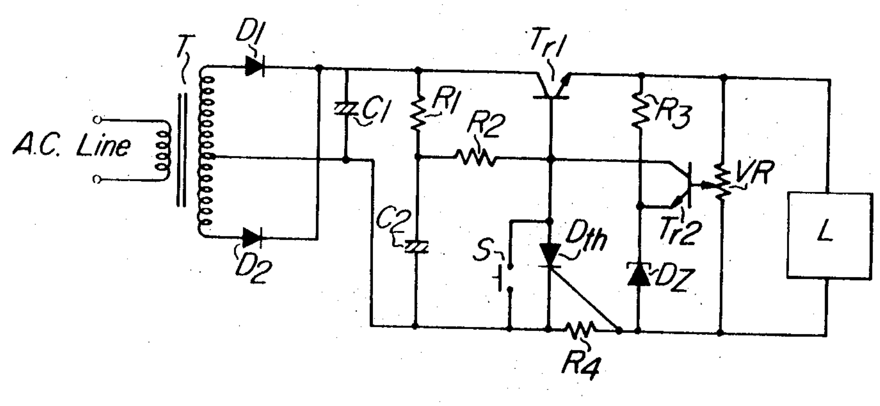
FIG. 2 is a circuit diagram of a prior art constant-voltage power source circuit provided with an overcurrent preventing means using a thyristor.

FIG. 2 shows one such circuit using a thyristor. In this circuit, overcurrent is detected by a resistor $R_4$. The resistor $R_4$ is selected such that when the voltage drop thereacross exceeds a predetermined value a thyristor $D_{th}$ is turned on. When the thyristor $D_{th}$ is turned on, it short circuits the base of the transistor $Tr_1$ to render the emitter potential of the transistor $Tr_1$ nearly zero, thus substantially cutting current off the load L. With this circuit, there is no possibility of the thermal breaking of the transistor $Tr_1$. In this circuit, when the thyristor $D_{th}$ is once turned on, it continues to carry current, which is characteristic of the circuit using a thyristor. In order to recover the original state of the circuit, a means to turn off the thyristor $D_{th}$ is necessary. To meet this requirement, a manual switch is usually provided for short-circuiting the anode and cathode of the thyristor $D_{th}$. The manual operation of the switch to return the circuit to the initial state, however, is very troublesome in actual use. Also, absolute protection of the circuit cannot be expected.

Figure 3:
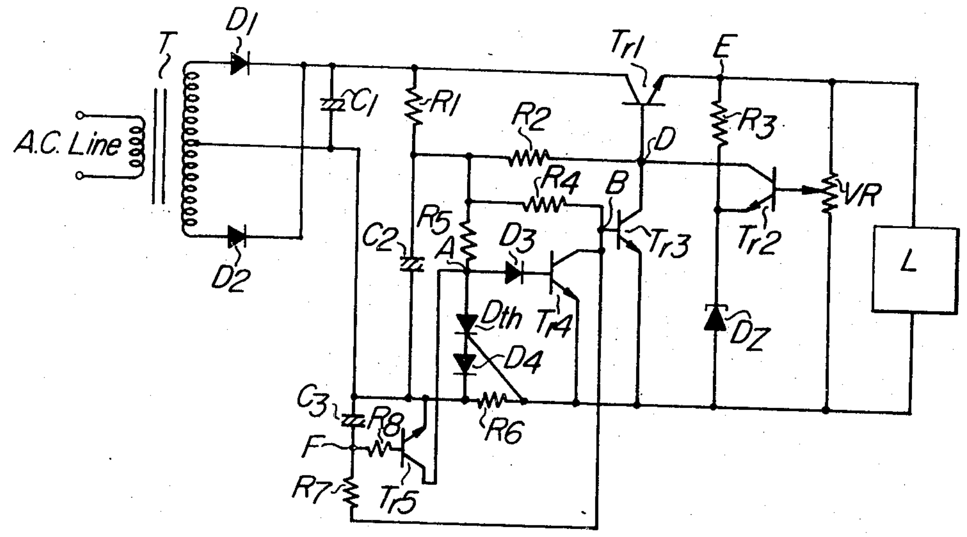
FIG. 3 is a circuit diagram of a power source circuit provided with an automatically restorable type overcurrent preventing means embodying the invention.

FIG. 3 shows a constant-voltage circuit according to the invention, which eliminates the above drawbacks while utilizing the fundamental excellent features of the thyristor. In the Figure, reference symbol $Tr_3$ designates a transistor for short-circuiting the base of the transistor $Tr_1$ to cut it off, symbol $Tr_4$ a transistor for controlling the transistor $Tr_3$, symbol $D_3$ a level-shift diode, symbol $R_4$ a load resistor for the transistor $Tr_4$, and symbol $R_5$ a base resistor for the transistor $Tr_4$, which also serves as the load resistor for a thyristor $D_{th}$. The thyristor $D_{th}$ is provided for the function of withholding the load current. The withholding period is determined by resistor $R_7$ and $R_8$, a capacitor $C_3$ and a transistor $Tr_5$.

Figure 5:
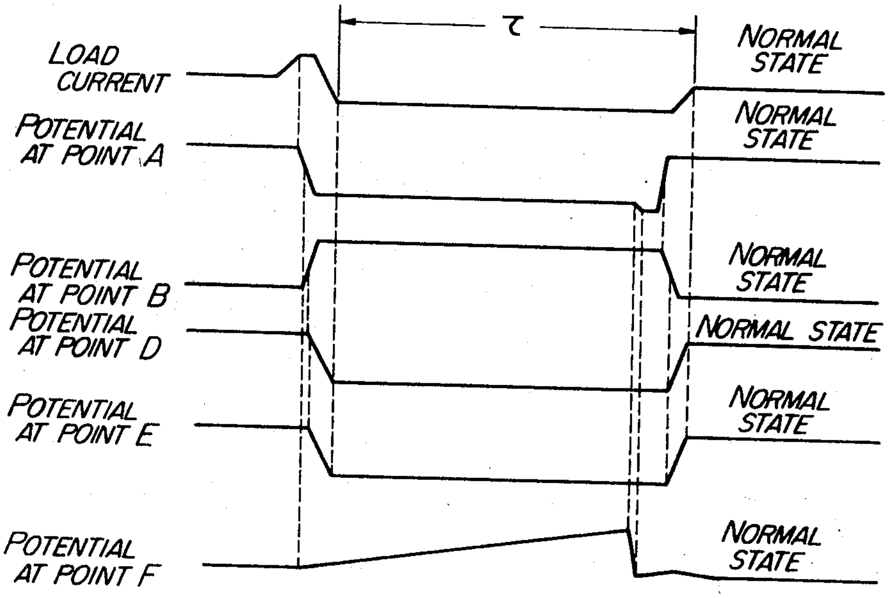
FIG. 5 is a graph illustrating the operational principles underlying the invention.

The operational principles underlying the invention will now be described with reference to FIG. 5, which shows potentials at various points in the circuit of FIG. 3. Point A is common to the anode of the thyristor $D_{th}$ and level-shift diode $D_3$, point B is the connection point between the collector of the transistor $Tr_4$ and the base of the transistor $Tr_3$, point D is the connection point between the collector of the transistor $Tr_3$ and the base of the transistor $Tr_1$, point E is at the emitter of the transistor $Tr_1$, and point F is common to the resistors $R_7$ and $R_8$ and the capacitor $C_3$.

When the load current increases to reach a preset value, the voltage drop across the resistor $R_6$ is increased to trigger the thyristor $D_{th}$, thus reducing the potential at point A. As a result, the transistor $Tr_4$ is triggered to increases the potential at point B. With increase in the potential at point B the transistor $Tr_3$ is triggered to reduce the potential at point D. As a result of the decrease of the potential at point D the emitter potential on the transistor $Tr_1$ at point E is reduced to reduce the output current. Meanwhile, with increase in the potential at point B the potential at point F begins to increase in accordance with the time constant depending upon the resistor $R_7$ and capacitor $C_3$. When the terminal voltage across the capacitor $C_3$ is increased to increase the potential at point F to a predetermined value, the transistor $Tr_5$ is triggered to reduce the potential at point A so as to turn off the thyristor $D_{th}$. The transistor $Tr_5$ carries current only for a short period of time, and the initial value of the potential at point A is soon recovered. When the potential at point A is increased the transistor $Tr_4$ is triggered again, reducing the potential at point B to turn off the transistor $Tr_3$, thus increasing the potential at point D to thereby increase the potential at point E. The potential at point F, on the other hand, is reduced since the potential at point B is reduced.

Figure 4:
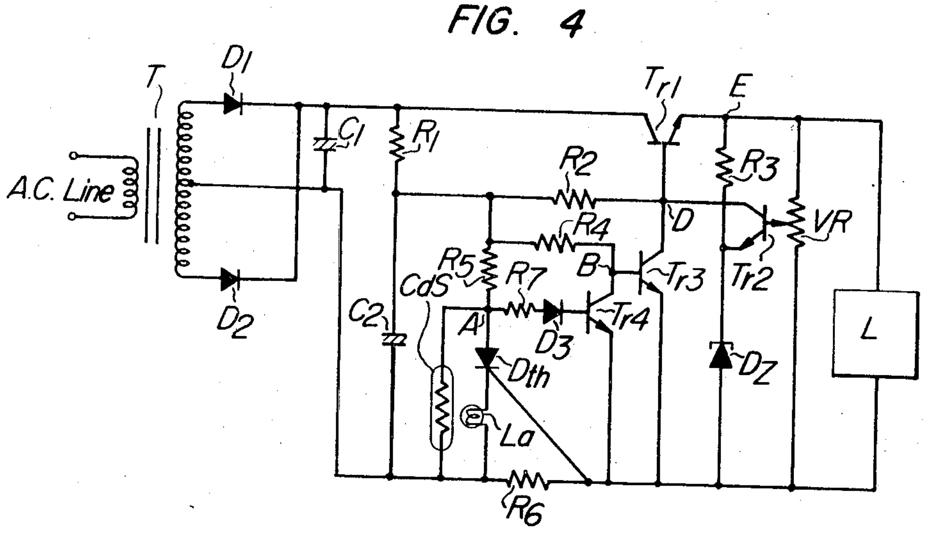
FIG. 4 is a circuit diagram of another embodiment of the power source circuit having an automatically restorable type overcurrent preventing means according to the invention.

FIG. 4 shows another embodiment of the invention.

Figure 6:
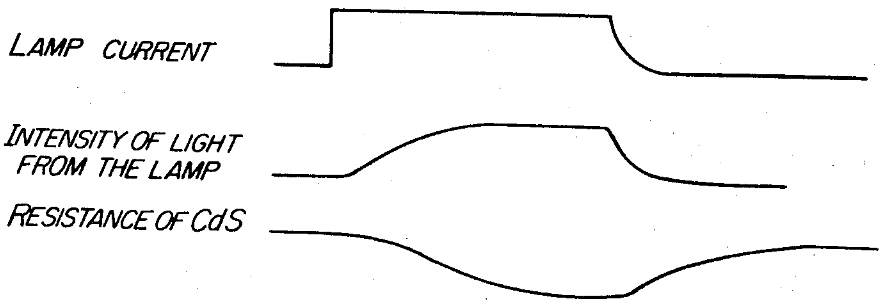
FIG. 6 is a graph illustrating the operational principles involved in the embodiment of FIG. 4.

In the Figure, reference symbol $Tr_3$ designates a transistor for short circuiting the base of the transistor $Tr_1$ to reduce the emitter potential thereof, symbol $Tr_4$ a transistor for controlling the transistor $Tr_3$, symbol $D_{th}$ a thyristor, symbol $R_4$ a load resistor for the transistor $Tr_4$, symbol $D_3$ a level-shift diode, symbol $R_7$ a resistor for adjusting the sensitivity of the transistor $Tr_4$ symbol $R_5$ a resistor serving both as the base resistor for the transistor $Tr_4$ and as the load for the thyristor $D_{th}$, symbol $R_6$ an overcurrent detection resistor, symbol La a means to convert the current through the thyristor $D_{th}$ into light, for instance a lamp, and symbol CdS a photoconductive cell optically coupled with the lamp La such that its resistance varies in accordance with the quantity of incident light, or more particularly, its resistance reduces with increase in the quantity of incident light and increases with decrease in the quantity of incident light. Point A is the anode point at the thyristor $D_{th}$, point B is the connection point between the collector of the transistor $Tr_4$ and the base of the transistor $Tr_3$, point D is the connection point between the collector of the transistor $Tr_3$ and the base of the transistor $Tr_1$, and point E is the emitter point at the transistor $Tr_1$. Normally, the transistor $Tr_3$ is "off", transistor $Tr_4$ "on" and thyristor $D_{th}$ "off", and no current is flowing through the lamp La, so that the resistance of the photoconductive cell CdS is high. When the load current exceeds a predetermined value, the voltage drop across the resistor $R_6$ is increased to trigger the thyristor $D_{th}$. Upon triggering of the thyristor $D_{th}$ current is caused to pass through the lamp La to light it. There is a certain delay time between the rushing of current into the lamp La and its lighting. Upon lighting of the lamp La the quantity of light incident on the photoconductive cell CdS is increased to reduce the resistance thereof. There is also a slight time delay between the instant of the incidence of light on the photoconductive cell CdS and the instance of the corresponding variation of the resistance of the photoconductive cell CdS. The interrelation among the lamp current, the intensity of light from the lamp and the resistance of the photoconductive cell is shown in FIG. 6. Meanwhile, upon triggering of the thyristor $D_{th}$ the transistor $Tr_4$ is triggered to increase the potential at point B. With the increase of the potential at point B the transistor $Tr_3$ is triggered to decrease the potential at point D, thereby decreasing the potential at point E to reduce the load current. With the decrease in the resistance of the photoconductive cell CdS the current therethrough is increased to decrease the current carried by the thyristor $D_{th}$. When the current through the thyristor $D_{th}$ becomes less than a predetermined holding current, the thyristor $D_{th}$ is turned off. Therefore, it is desirable to preset the lamp La and the photoconductive cell CdS such that the resistance of the photoconductive cell CdS is sufficiently low even with as low current through the thyristor $D_{th}$ as equal to the predetermined holding current. When the thyristor $D_{th}$ is cut off, current through the lamp La ceases, so that the lamp La is turned off to stop the irradiation of the photoconductive cell CdS. As a result, the resistance of the photoconductive cell CdS increases to increase the potential at point A. With the increase of the potential at point A the transistor $Tr_4$ is triggered to decrease the potential at point B, thereby turning off the transistor $Tr_3$ to increase the potential at point D. Thus, the initial condition of the circuit is recovered. In this embodiment, the time delay involved between the rushing of current into the lamp La and the lighting thereof and between the instant of irradiation of the photoconductive cell CdS and the instant of change of the resistance thereof is effectively utilized. In FIG. 5, 7 represents the period, during which period the protective action is being performed. The potential at points A to E in this embodiment varies in a similar way to that shown in FIG. 5. As has been described in the connection with the foregoing embodiments of FIGS. 3 and 4, according to the invention it is possible to automate the operation of recovering the normal state of the overcurrentproof constant-voltage circuit using a thyristor, which has heretofore been manually attained by means of a pushbutton switch. Thus, the overcurrentproof constant-current circuit according to the invention has both the function of reducing the burden on the control transistor at the time of its action, which is the feature of the thyristor, and the function of automatically recovering its normal state.

What is claimed is:

1. A power source circuit comprising a current control means to be connected in series with a load, an overcurrent preventing means connected to said current control means and having a thyristor, said overcurrent preventing means comprising a means for recovering the normal state of said thyristor after the lapse of a predetermined time interval following the actuation of said overcurrent preventing means, whereby when current supplied to said load exceeds a predetermined value said overcurrent preventing means is actuated to operate said current control means so as to temporarily cut the current supply to said load for a constant period of time until the normal state of said current control means is restored by said overcurrent preventing means, and wherein said means for recovering the normal state of said thyristor in said overcurrent preventing means consists of a circuit having a predetermined time constant for short circuiting said thyristor to turn off said thyristor after the lapse of a predetermined time interval after the terminal voltage across said thyristor is changed to trigger said thyristor.

2. A power source circuit comprising a current control means to be connected in series with a load, an overcurrent preventing means connected to said current control means and having a thyristor, said overcurrent preventing means comprising a means for recovering the normal state of said thyristor after the lapse of a predetermined time interval following the actuation of said overcurrent preventing means, whereby when current supplied to said load exceeds a predetermined value said overcurrent preventing means is actuated to operate said current control means so as to temporarily cut the current supply to said load for a constant period of time until the normal state of said current control means is restored by said overcurrent preventing means, and wherein said circuit having a predetermined time constant includes a resistor and a capacitor connected in series, on which circuit there is impressed a voltage corresponding to the terminal voltage across said thyristor in said overcurrent preventing means, and a transistor connected in parallel with said thyristor for detecting the terminal voltage across said capacitor, whereby when said thyristor is triggered a voltage is impressed across said resistor and the capacitor connected in series, and when said transistor is triggered said transistor short circuits said thyristor for a constant time determined by the time constant of said series circuit.

3. A power source circuit according to claim 1, wherein said circuit having a predetermined time constant includes a transistor for detecting the terminal voltage drop across said thyristor in said overcurrent preventing means, a series connection of a resistor and a capacitor, said series connection being connected between the collector and emitter of said transistor, and a transistor connected in parallel with said thyristor and cutting off said thyristor by detecting a voltage built up across said capacitor.

4. A power source circuit according to claim 1, wherein said circuit having a predetermined time constant includes a light source connected in series with said thyristor in said overcurrent preventing means, and a photoconductive element connected in parallel with said thyristor and optically coupled with said light source and delay in the operation of said photoconductive element with respect to the operation of said light source is utilized.

5. A power source circuit according to claim 4, wherein said light source is a lamp and said photoconductive element is a CdS cell.

* * * * *